Sept. 18, 1945.  G. W. MOFFITT  2,385,019
OPTICAL INSTRUMENT
Filed Aug. 11, 1942  2 Sheets-Sheet 1

INVENTOR
GEORGE W. MOFFITT
BY E. C. Sanborn
ATTORNEY

Sept. 18, 1945.　　　G. W. MOFFITT　　　2,385,019
OPTICAL INSTRUMENT
Filed Aug. 11, 1942　　　2 Sheets-Sheet 2
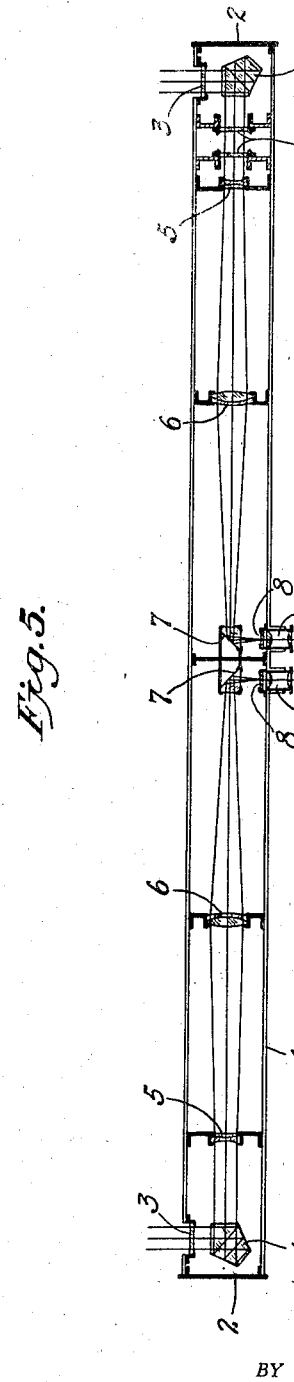
INVENTOR
George W. Moffitt
BY
E. C. Sanborn
ATTORNEY Patented Sept. 18, 1945

2,385,019

UNITED STATES PATENT OFFICE 2,385,019

OPTICAL INSTRUMENT

George Wilber Moffitt, Ridgewood, N. J.

Application August 11, 1942, Serial No. 454,379

8 Claims. (Cl. 88—2.6)

This invention relates to optical instruments and has for its object the minimizing or elimination of the errors resulting from slight transient, or temporary bending from any cause in sighting instruments, self-contained base range finders, telemeters, height finders, and the like. While the invention could be applied in the design of a variety of instruments its application to the self-contained base range finder, for the purpose of minimizing or of eliminating the errors introduced by unequal heating, as from sunshine, or by gravitational effects when the line of sight changes in elevation, will be used here as an illustration of the principles involved, without in any way limiting the general applicability of the invention.

It is well known that heating one side of a tubular metal structure causes the ends of the tube to bend away from the source of the heat. In an ordinary range finder such bending results in a misalignment of the optical parts of the instrument, with consequent errors in the determination of range. My invention provides a way to practically eliminate such errors by a proper choice of optical characteristics and location of the component optical parts that comprise the optical system of the range finder. In some types of range finder other gains are made possible in connection with entrance pupil, magnification, field of view, and mechanical design.

I am aware that attempts in this direction have already been made, notably that recorded in U. S. Patent No. 2,008,516 issued July 16, 1935, to Artur Pulz, of Jena, Germany, and assigned to Carl Zeiss, in which it is shown that the use of tele-objectives in a range finder tends to reduce the errors due to the bending of the optical tube resulting from radiant heat applied from one direction, as from sunshine. But by this means only a slight reduction of the error is possible and full compensation of the error cannot be realized. On the other hand, by the use of my present invention it is possible to achieve greater compensation, in fact substantially complete compensation, or even over-compensation, of errors arising from any transient distributed bending of the optical tube from any cause.

I achieve this result by substituting for each ordinary objective of a range finder an objective system composed of an anterior lens, or groups of lenses, having a negative (diverging) equivalent focal length, and a posterior lens, or groups of lenses, having a positive (converging) equivalent focal length. The two lenses or groups of lenses are proportioned and spaced in a manner to be described presently.

In the accompanying drawings:

Fig. 5 shows in central longitudinal section a constructional example of a stereoscopic range finder embodying the invention.

It is well known that in the range finders now in use a pair of reflecting constant deviation prisms or mirror systems are mounted within an exterior housing near the opposite ends thereof, and that between said prisms and within said exterior housing there is mounted an interior tube, known as the optical tube, in each end of which is a telescope objective. Said interior tube also has mounted therein, between said objectives, a coincidence prism. Heat falling on one side of the range finder expands the metal on that side and causes both ends of the instrument to bend away from the direction whence the heat comes; and the same is true to a lesser extent of the optical tube of the instrument.

Figure 1:
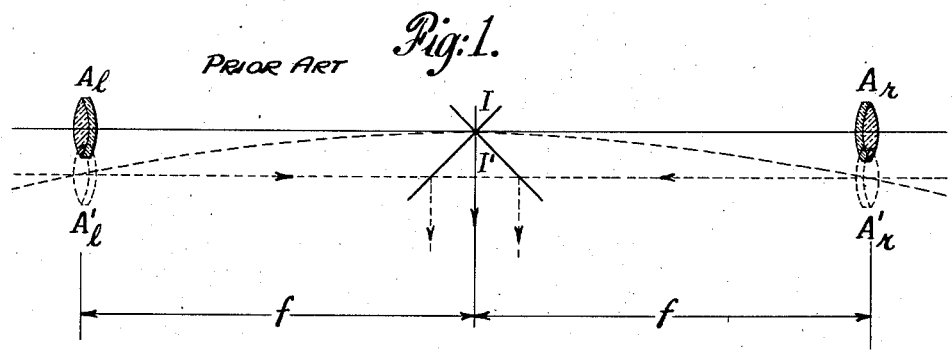
Fig. 1 is a schematic view illustrating the effect of the bending of the optical tube in a conventional coincidence range finder with ordinary telescope objectives.

The optical tube system of an ordinary range finder is shown schematically in Figure 1, where $f$ is the equivalent focal length of the objectives $A_l$ and $A_r$ with common focal plane in the coincidence prism at the center, here represented by a cross. Whenever an optical tube becomes curved, through asymmetrical heating, or any other cause, the second principal points of the objectives are thrown out of alignment with the coincidence prism, and readings of the instrument will then be in error. The dotted portion of Figure 1 shows the situation, greatly exaggerated for the sake of clarity. In effect the objectives have moved over to $A'_l$ and $A'_r$, and the portions of the image of the target seen above and below the dividing line are no longer in coincidence but are in error by $2II'/f$ in radian measure. Since a range finder must measure angles down to the fraction of a second of arc it is obvious that such effects must be reduced to a minimum. Elaborate precautions are taken to make the structure rigid, but very little has been done in the way of compensation in simpler structures.

Figure 2:
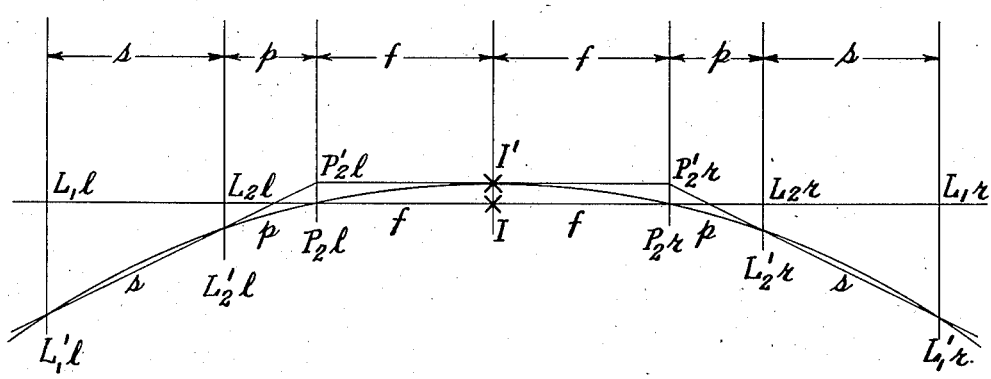
Fig. 2 is a similar view illustrating the effect of the bending of the optical tube when an anterior negative lens (or lens group) and a posterior positive lens (or lens group) are substituted for each telescope objective of a conventional range finder.
Figure 3:
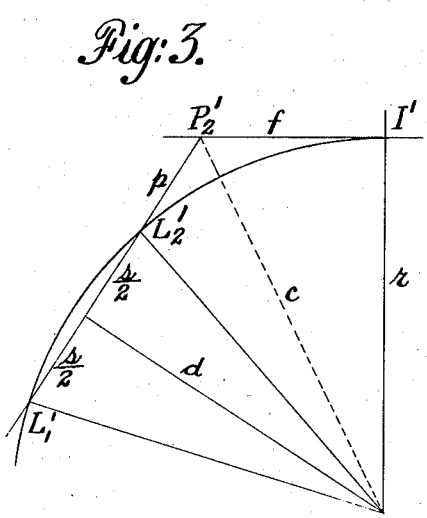
Fig. 3 is a view illustrating the geometry of the problem involved.

Figure 2 illustrates schematically the geometry of an optical system employing in lieu of each of the telescope objectives of the conventional range finder, an objective system composed of an anterior lens, or group of lenses, having a negative equivalent focal length, and a posterior lens, or groups of lenses, having a positive focal length. $L_{1l}$ and $L_{2l}$, and $L_{1r}$ and $L_{2r}$ represent the location of the negative and the positive components of the left and the right objective systems respectively, while $P_{2l}$ and $P_{2r}$ represent the location of the second principal points of said objective systems. The optical separation of the two components of each of said objective systems is represented by $s$, while the distance from the second, or positive, component to the second principal point is designated by $p$. The equivalent focal length of each of said objective systems is designated by $f$. In a state of good adjustment and of temperature equilibrium the centers of the various components and of the coincidence prism I are on the straight line $L_{1l}IL_{1r}$. But if a temperature gradient exists in the supporting structure the whole system will assume a curved configuration (shown greatly exaggerated in Figure 2) the various components moving over to the primed positions. It will be noticed that the second principal points and the center prism have moved over in the same direction with respect to the original straight-line configuration. Inspection of the figure reveals that it should be possible to so proportion $s$, $p$ and $f$ with respect to each other that the second principal points and the center prism would remain on a straight line in spite of the bending of the structure. The geometry of the problem is shown in Figure 3, which represents the left-hand half of the optical system with the bending greatly exaggerated. For simplicity let us assume that the axis of the optical system becomes curved in a circular arc. Of course, the actual form of the curve in any case will depend upon the design and construction of the instrument. But the actual curve having been determined for a given design, the problem can be worked out to suit that curve in much the same manner as for the circular curve. From the figure we have $$f^2 + r^2 = c^2 \quad (1)$$

and $$c^2 = \left(p + \frac{s}{2}\right)^2 + d^2 \quad (2)$$

Combining (1) and (2) gives $$f^2 + r^2 = \left(p + \frac{s}{2}\right)^2 + d^2 \quad (3)$$

But $$r^2 = \frac{s^2}{4} + d^2 \quad (4)$$

Eliminating $r$ by combining (3) and (4) gives $$f^2 = p(p+s) \quad (5)$$

as the condition sought.

Since $p+s$ and $p$ are the distances from the anterior negative lens and the posterior positive lens, respectively, to the second principal point of the entire objective system, the condition may be stated as follows: The product of the distances of the two lenses from the second principal point of the entire objective system is equal to the square of the equivalent focal length of the entire objective system. Or, in the language of geometry, the equivalent focal length of the entire objective system is the mean proportional between the distances of the two lenses from the second principal point of the entire objective system.

If one wishes to express the relationship in terms of the distances from the two lenses to the second principal focal plane (focal plane for infinitely distant object) of the entire objective system, then the sum of the reciprocals of these two distances is equal to the reciprocal of the equivalent focal length of the entire objective system.

To determine the necessary equivalent focal lengths for $L_1$ and $L_2$ we turn to the equations for equivalent focal length and location of principal points of a combination of two separated lens systems. Let $f_1$ be the equivalent focal length of $L_1$ and $f_2$ that of $L_2$, while $s$ is the optical separation of the two and $p$ is the distance from $L_2$ to the second principal point $P_2$. Further, let $f$ be the equivalent focal length of the combination. Then $$f = \frac{f_1 f_2}{f_1 + f_2 - s} \quad (6)$$

and $$p = -\frac{fs}{f_1} \quad (7)$$

positive when $P_2$ lies to the right of $L_2$. Substituting these values in Equation 5 gives $$f^2 = -\frac{fs}{f_1}\left(s - \frac{fs}{f_1}\right) \quad (8)$$

or $$f = -\frac{s}{f_1}\left(s - \frac{fs}{f_1}\right) \quad (9)$$

or $$f = \frac{fs^2}{f_1^2} - \frac{s^2}{f_1} \quad (10)$$

or $$s = \pm f_1 \sqrt{\frac{f}{f - f_1}} \quad (11)$$

And from Equation 6 comes $$f_2 = f\left(\frac{s - f_1}{f - f_1}\right) \quad (12)$$

These are the equations with which one may fully determine the focal lengths and the location of the various lenses in order that compensation of bending be complete, in the case of a circular arc.

In my arrangement, where a negative lens, or lens group, $L_1$, is followed at an optical distance $s$ by a positive lens, or lens group, $L_2$, the conditions are such that a real and inverted image is formed beyond $L_2$ and $P_2$. Therefore, the equivalent focal length is positive. For an equivalent focal length of $+1$ Equation 11 becomes $$s^2 = \frac{f_1^2}{1 - f_1}, \text{ or } s = \pm \frac{f_1}{\sqrt{1 - f_1}} \quad (13)$$

The data for a number of systems all having an equivalent focal length $+1$ and satisfying the equations for compensation of bending are tabulated in Table I, all other quantities being expressed in terms of this unit focal length.

*Table I*

($f = +1$)

| $f_1$ | $f_2$ | $s^2$ | $s$ | $p$ | $BF = p+f$ | $BF+s$ |
|---|---|---|---|---|---|---|
| −0.25 | 0.3789 | 0.0500 | 0.2236 | 0.8944 | 1.8944 | 2.1180 |
| −0.5 | 0.6055 | 0.1667 | 0.4083 | 0.8166 | 1.8166 | 2.2249 |
| −1.0 | 0.8535 | 0.5000 | 0.7071 | 0.7071 | 1.7071 | 2.4142 |
| −2.0 | 1.0516 | 1.3333 | 1.1547 | 0.5774 | 1.5774 | 2.7321 |
| −3.0 | 1.1250 | 2.2500 | 1.5000 | 0.5000 | 1.5000 | 3.0000 |
| −4.0 | 1.1578 | 3.2000 | 1.7889 | 0.4472 | 1.4472 | 3.2361 |
| −8.0 | 1.1850 |  | 2.6667 | 0.3333 | 1.3333 | 4.0000 |

With this table one may determine the values that will apply in any given case in which the focal plane of the objective systems is at, or quite near, the middle of the instrument.

Figure 4:
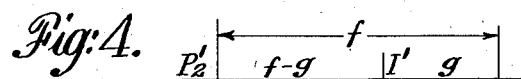
Fig. 4 shows the geometrical configuration when the distance $P'_2I'$ in Fig. 3 is less than the equivalent focal length.

Usually, however, P₂I will be somewhat less than the equivalent focal length, because a portion of the light path will be folded in various ways in the center prisms and the images brought to the focal planes of the eyepieces, or eyepiece as the case may be. Figure 4 shows the geometrical configuration. It is obvious that $f-g$ will then take the place of $f$ in Equation 5.

Moreover, in cases in which P₂I is greater than the equivalent focal length, as may be the case in both coincidence and stereoscopic instruments having lens erecting systems, methods similar to those used above result in the following equation:

$$f(f+2h) = p(p+s) \quad (14)$$

in which $h$ is the distance by which the focal plane falls short of the middle point I of the optical tube and the other symbols have the meanings assigned to them above.

And in a like manner, when $h$ is known, one may form a table, similar to Table I, of values applying in this case.

Although the results above obtained are for a structure that bends in the form of a circular arc, it is obvious that the same general method applies to any other kind of bending. Once the bent shape is known, the proper proportioning of the system may be determined.

To summarize, if it is proposed to use my invention in a range finder for the purpose of compensating the bending due to heating from one direction, as from sunshine, the first step is to determine the form that the axis of the lens-supporting structure assumes when the instrument is receiving heat from one direction. If a model of the supporting structure can be made, the form of the bending can be determined experimentally. If no model is available, an estimate of the approximate form can be made from the general design of the instrument, and from such an estimate an approximate solution for the focal lengths and locations of a trial set of lenses may be made. The experimental performance of a model so made will give information for the further refinement of the system. Since a simple tubular structure would bend to a curve approximating a circular arc, the circular arc is used as an illustrative example. Those skilled in the art will have no difficulty in applying the method to other forms of bending.

From what has been pointed out hereinbefore it will be seen that for complete compensation of bending in a tube that bends in the form of a circular arc, and in an instrument in which the focal planes of the two objective systems are at, or quite near, the middle of the optical tube, the lenses must be located in accordance with equation $$(f-g)^2 = p(p+s)$$

when the focal plane of the objective system lies beyond said middle point. In said equation, $g$, as indicated in Fig. 4, is the distance by which the focal plane extends beyond said middle point. Of course, when said focal plane lies at said middle point, $g$ becomes zero in said equation.

On the other hand, when the focal plane of the objective system lies on the same side of the middle of the optical tube as does the objective system itself, as will be the case in both coincidence and stereoscopic instruments containing lens-erecting systems, the lenses should be located in accordance with the equation $$f(f+2h) = p(p+s)$$

in which $h$ is the distance by which the focal plane falls short of the middle point of the optical tube.

In each of said equations
- $p$ = the actual distance from the second principal point of the posterior lens, or lens group, to the second principal point of the anterior negative-posterior positive lens system.
- $s$ = the actual distance between the adjacent principal points of the two lenses or groups of lenses that constitute the anterior negative-posterior positive lens system.

The equivalent focal lengths of the lenses, or groups of lenses, that will comply with the above-stated relationship may be readily determined as indicated above.

Of course, should less than complete compensation be desired, the lenses may be located accordingly. The same is also true with respect to over-compensation, should such be desired.

In referring to the relative positions of the lenses in an optical tube, it will be understood that I do not intend to be limited to the positioning of the lenses in an inner tube since my invention extends to the positioning of the lenses, in accordance with the equations above specified, in a single or outer tube, as may be expedient in some cases.

It will also be apparent that while my invention has been specifically described in conjunction with a range finder, such is merely by way of example, and that the invention is not restricted to any particular optical instrument. For instance, the invention may be applied in the manner above described to compensate for errors arising from bending of the tube of a telescope, in which case the relationship of parts shown in either half of Fig. 2 would apply, and the point I would represent a reference mark such as a reticule or cross wire in or near the focal plane of the objective system.

Fig. 5 illustrates an embodiment of the invention in a stereoscopic range finder. The supporting structure is in the form of the conventional external tube 1, closed at the ends by the customary covers 2. The usual windows 3 in the tube 1 admit light from a distant target to conventional constant deviation prism or mirror systems 4, which deviate the light rays in the direction of the range finder base. In accordance with my invention there is disposed in each half of the tube 1 an objective system composed of an anterior negative lens group 5 followed by a posterior positive lens group 6 conforming in location and focal lengths with the principles hereinbefore disclosed. The light rays, after being deviated in the direction of the customary eyepieces 9 by the conventional deviating prisms 7, are imaged on the usual reticules 8 which are provided with customary stereoscopic measuring marks. It will be readily understood that while, for purposes of illustration, the eyepieces 9 are shown with their axes in the plane of the drawings, an inclined position of said eyepieces could be employed by the use of other forms of deviating prisms 7. A range measuring device of well known type, comprising a pair of oppositely rotating glass wedges 10, is disposed between the constant deviation system 4 and the anterior negative lens group 5 in one end of the instrument.

The parts 5 and 6 are located with respect to the parts 7 and 8, and to each other, and the focal lengths of the parts 5 and 6 are chosen, in accordance with the teachings of my invention as hereinbefore set forth.

The terms and expressions which I have employed are used as terms of description and not of limitation, and I have no intention in the use of such terms and expressions, of excluding any equivalents of the features shown and described or portions thereof, but recognize that various modifications are possible within the scope of the invention claimed.

I claim:

1. In an optical system, an anterior negative-posterior positive lens system, and a structure supporting said system, the components of said system being so positioned with respect to each other and to a selected point on said structure that upon bending of said structure a straight line drawn through the second principal point of the displaced lens system and said selected point on said structure is substantially parallel to a straight line drawn through said second principal point and said point on said structure when said structure is unbent.

2. In a self-contained base range finder, an optical system comprising a tube, an anterior negative-posterior positive lens system in one end portion of said tube, an anterior negative-posterior positive lens system in the opposite end portion of said tube, and means between said lens systems for deflecting light therefrom to an observer, the components of said lens systems being so located with respect to each other and to said deflecting means that on bending of said tube, a given point in said means and the second principal points of said systems are maintained substantially on a straight line.

3. In an optical instrument, an anterior negative-posterior positive lens system, a structure supporting said lens system, and means on said structure in the path of light passing from said lens system to an observer, the distance from the second principal point of said system to a given point in said means being so related to the distance from said second principal point to the second principal point of the posterior component of said lens system and to the distance between the adjacent principal points of the components of said system as to compensate for errors introduced by the bending of said structure.

4. In an optical instrument, an anterior negative-posterior positive lens system, a structure supporting said lens system, and means on said structure in the path of light passing from said lens system to an observer, the components of said lens system being located with respect to each other and to a selected point on said means substantially in accordance with an equation of the type represented by $$(f-g)^2 = p(p+s)$$

where $f$ represents the equivalent focal length of said system, $g$ represents the optical distance from said selected point to the focal plane of said system, $p$ represents the distance from said second principal point to the second principal point of the posterior component of said system, and $s$ represents the distance between adjacent principal points of the components of said lens system.

5. In an optical instrument, an anterior negative-posterior positive lens system, a structure supporting said lens system, and means on said structure in the path of light passing from said lens system to an observer, the focal plane of said lens system lying beyond a selected point on said means, the components of said lens system being located with respect to each other and to said point in accordance with the equation $$(f-g)^2 = p(p+s)$$

where $f$ represents the equivalent focal length of said system, $g$ represents the optical distance from said selected point on said means to the focal plane of said system, $p$ represents the distance from said second principal point to the second principal point of the posterior component of said system, and $s$ represents the distance between adjacent principal points of the components of said lens system.

6. In an optical instrument, an anterior negative-posterior positive lens system, a structure supporting said lens system, and means on said structure in the path of light passing from said lens system to an observer, the focal plane of said lens system lying on the same side of a selected point on said means as does said lens system, the components of said lens system being located with respect to each other and to said point in accordance with the equation $$f(f+2h) = p(p+s)$$

where $f$ represents the equivalent focal length of said lens system, $h$ represents the distance by which the focal plane of said system falls short of said point, $p$ represents the distance from the second principal point of said system to the second principal point of the posterior component of said system, and $s$ represents the distance between adjacent principal points of the components of said lens system.

7. In an optical instrument, an anterior negative-posterior positive lens system, a reference mark in the field of view near to or coincident with the image formed by said system, an eyepiece for viewing said image and reference mark, and a structure for supporting the aforementioned parts, the components of said optical system being so positioned with respect to each other and to said reference mark that upon bending of said structure a straight line drawn through the second principal point of the displaced lens system and a selected point on the said reference mark is substantially parallel to a straight line drawn through the said second principal point and said selected point on the reference mark when said structure is unbent.

8. In a self-contained base range finder, an optical system comprising a tube, an anterior negative-posterior positive objective lens system in one end portion of said tube, an equal anterior negative-posterior positive objective lens system in the opposite end portion of said tube, and means between said lens systems for deflecting light therefrom to an observer, the components of said lens systems being so located with respect to each other and the image plane of said systems that the sum of the reciprocals of the distances of the anterior negative lens group and the posterior positive lens group from the image plane of said objective systems is substantially equal to the reciprocal of the equivalent focal length of the said anterior negative-posterior positive objective lens systems.

GEORGE WILBER MOFFITT.